United States Patent

[11] 3,602,946

| [72] | Inventors | Glauco E. Curetti<br>Zurich;<br>Ernest A. Ackermann, Chene-Bourg-<br>Geneva, both of, Switzerland |
|---|---|---|
| [21] | Appl. No. | 803,743 |
| [22] | Filed | Mar. 3, 1969 |
| [45] | Patented | Sept. 7, 1971 |
| [73] | Assignee | Hoffco S.A.<br>Geneva, Switzerland |
| [32] | Priority | Mar. 7, 1968, Dec. 20, 1968, Jan. 24, 1969 |
| [33] | | Switzerland |
| [31] | | 3,527/68, 19,069/68 and 1,067/69 |

[54] APPARATUS FOR HEAT-SHAPING THIN-WALLED CONTAINERS OF PLASTICS MATERIAL
14 Claims, 25 Drawing Figs.

[52] U.S. Cl. ................................................. 18/20 B,
18/5 BP, 18/5 BS, 18/19 H, 18/DIG. 18
[51] Int. Cl. ........................................................ B29c 3/02
[50] Field of Search ........................................... 18/5 BM, 5
BP, 5 BS, 19 H, 19 M, 20 B, DIG. 18

[56] References Cited
UNITED STATES PATENTS

| 2,914,801 | 12/1959 | Colombo ..................... | 18/5 BM X |
| 3,409,939 | 11/1968 | Hey ............................. | 18/5 BM |
| 3,471,896 | 10/1969 | Ninneman .................... | 18/5 BM |
| 3,510,913 | 5/1970 | Edwards ....................... | 18/5 BM X |

FOREIGN PATENTS

| 642,609 | 1/1964 | Belgium ...................... | 18/5 |

*Primary Examiner*—J. Spencer Overholser
*Assistant Examiner*—John E. Roethel
*Attorney*—Young & Thompson

ABSTRACT: This invention relates to an apparatus for heat-shaping thin-walled containers of plastics material, which performs the injection of a plastics material volume in a preform having a greater capacity than this volume, the compression of said volume of plastics material to form a membrane fastened on a transfer ring through its periphery, the transfer of said ring provided with the membrane to a heat-forming station when the container is formed out of said membrane and finally the transfer of the ring with the plastics material scrap to a scrap-removing station.

FIG.1

INVENTORS
GLAUCO E. CURETTI
ERNEST A. ACKERMANN
By Young + Thompson
ATTYS.

APPARATUS FOR HEAT-SHAPING THIN-WALLED CONTAINERS OF PLASTICS MATERIAL

The present invention relates to apparatus for heat-shaping thin-walled containers of plastics material in which, in a first stage, a rough shape is made then in a second stage, after transfer of the rough shape, said rough shape is drawn to obtain the finished container.

Apparatus of this type is known at present, however in the majority of cases the first stage comprises injecting plastics material in the moldable state into a mold of which the shapes are a rough shape or a first stage of the shapes of the finished container. This requires very exact temperature regulation of the molds during injection and during transfer of the rough shape to its shaping station, as the surface area of the rough shape which is in contact with the mold is large, with the result that the rough shape reaches the temperature of the mold almost immediately. This precise temperature regulation is difficult to carry out and results in complex and troublesome heating and regulating devices.

There is also known another shaping apparatus which, in a first stage, functions by shaping an unformed mass of plastics material in the moldable state in a mold which does not prefigure the final shape of the container to be formed, then in a second stage, shaping a disc or a pad of plastics material, still in the moldable state, by means of a first punch, then finally in third stage and after a second transfer, shaping the container proper.

In this apparatus, although a rough shape has been produced in the form of a disc, which allows better maintenance of the temperature thereof, this rough shape is nonetheless in close contact with the mold over a large surface area and in addition it is necessary to carry out two transfer operations, with the result that it is also necessary to provide exact and constant regulation of the mold temperature in order to maintain the rough shape in a suitable moldable state.

It has also been found that the operations of the two aforedescribed apparatus necessarily result in nonuniform cooling of the mass of plastics material when it is injected or compressed in the mold, resulting in the occurrence of rupture lines and internal stresses in the mass of plastics material from which the container is to be formed, with the result that a relatively high number of containers must be rejected with substantial differences in the thickness of the containers between one point and another. These disadvantages lead to the production of containers which have a relatively thick wall in order to reduce the number of defective containers, but this entails an additional expenditure on raw material.

The apparatus for carrying out the process according to the invention is characterized in that it comprises a transfer device comprising a transfer body provided with an axial aperture and a peripheral hooking formation located on the wall of said aperture, an injection and compression device having a support piston and an injection piston arranged on respective sides of the transfer body and displaceable axially with respect to one another, each of said pistons cooperating with one side of the transfer body to close the axial aperture thereof in order to form a closed space confined between the pistons and the transfer body, a transfer device for transferring the transfer body from its injection and compression position into a shaping position, and a shaping device for shaping the diaphragm of plastics material which is fixed to the transfer body by the injection and compression device, comprising a punch and a die located on respective sides of the transfer body when said transfer body is in the shaping position, and being displaceable with respect to one another for shaping a container.

The accompanying drawings illustrate in diagrammatic form and by way of example, an embodiment of the apparatus according to the invention.

The different successive operations of heat shaping will now be described with reference to FIGS. 2 to 12.

Figure 2:
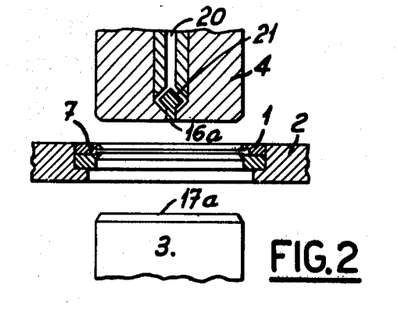
FIGS. 2 to 12 illustrate in diagrammatic form the different successive operations of the heat-shaping process.

FIG. 2 shows a transfer body or ring 1 which is located in a recess in a transfer plate 2 being set in the position for injection. Thus this ring 1 is placed between the support piston 3 heated by a heater 3a and the injection piston 4 heated by a heater 4a.

Figure 3:
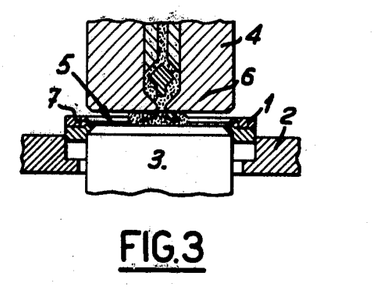

The support piston 3 is then displaced toward the injection piston and the ring 1 comes to lie on the head of the piston 3 which blocks the lower face thereof (FIG. 3). The ring 1 and the piston 3 thus form a recess 5 into which the plastics material 6 is introduced by the injection piston 4.

As the distance between the end faces of the support piston 3 and the injection piston 4 is small, the plastics material 6 spreads in the interior of the space 5 which forms a mold to shape a thick pad, the diameter of which is less than that of the recess 5. The plastics material 6 is therefore made into the shape of a thick pad without having been put under pressure. This is important as in that case it is not necessary to use a high injection pressure, which permits the use of simple and conventional injection means to introduce the plastics material.

Figures 4, 5, 6, 7:
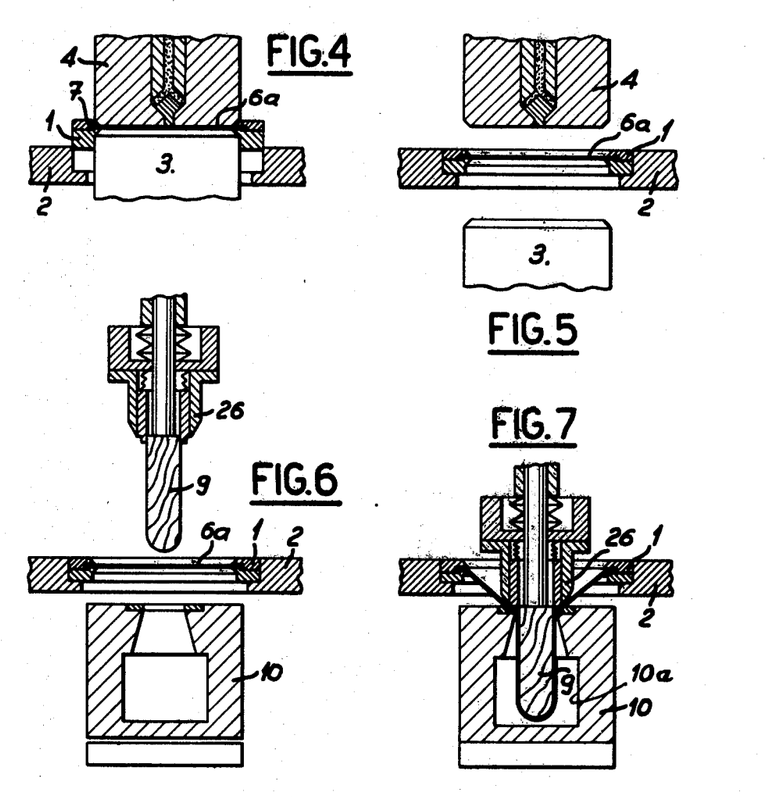
Figure 8:
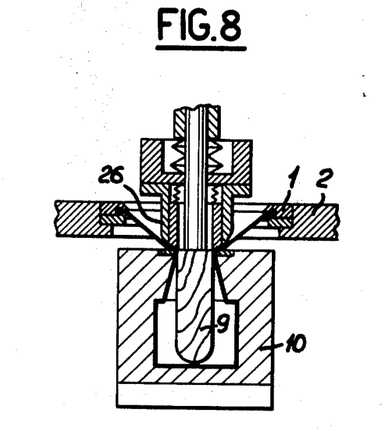
Figure 9:
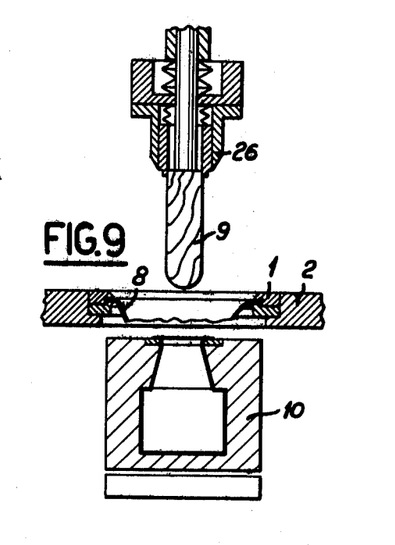

Once the desired amount of plastics material has been introduced into the recess 5, the support piston 3 is displaced toward the injection piston 4 which blocks the upper face of the ring 1 (FIG. 4). During this displacement, the plastics material 6 is highly compressed and made into the form of a diaphragm 6a, the periphery of which is engaged into a hooking groove 7 of the ring 1 in order to secure said diaphragm to the ring 1.

It should be noted that no force is applied to the transfer plate 2 as the ring 1 is removably located thereon and that during injection (FIG. 3) and compression (FIG. 4) the ring 1 is held between the support piston 3 and the injection piston 4. To maintain the diaphragm 6a of plastics material at its shaping temperature, the temperature of the pistons 3 and 4 has only to be regulated, which is easy in view of the fact that they do not represent a large mass and that one is fixed, while the other only carries out a small movement in the axial direction only. The ring 1 has a low specific heat with respect to the pistons 3, 4 so that it reaches their temperature almost instantaneously when in contact with them. Additionally, as the ring 1 is simply placed in a recess in the transfer plate 2, there is formed a heat barrier, which can be reinforced if necessary, between the ring and the transfer plate so that the plate 2 does not have to be maintained at a given temperature, particularly as the diaphragm 6a is in contact with the ring over its periphery only and that cooling of the periphery is desired in order to secure the diaphragm to the ring 1.

The support piston 3 is then relowered (FIG. 5), the ring 1 resumes its normal position in the transfer plate 2 and the diaphragm is secured in the ring at its periphery. Therefore the diaphragm of compressed plastics material is in contact virtually only with air, which greatly retards its temperature drop. In addition, a certain cooling during transfer of the diaphragm, by rotation of the plate 2, into its shaping position (FIG. 6) is desired. In fact, the temperature of injection and compression of the plastics material is higher than its shaping temperature, so as to prevent any lack of uniformity or incipient rupture or internal stress in the diaphragm 6a, thus permitting the shaping of a container from a disc of inert plastics material which can be uniformly drawn.

The container is firstly shaped mechanically (FIG. 7) and then the container is put into its final form against walls 10a of die 10 by inflation or vacuum shaping (FIG. 8), for example by operation of vacuum unit 10b or pressure unit 10c, and the finished container is severed from the waste which comprises an annular portion of plastics material 8 which remains fixed to the ring 1.

Figures 10, 11:
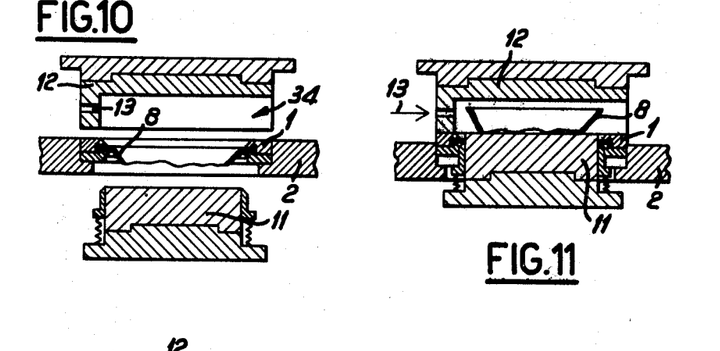
Figure 12:
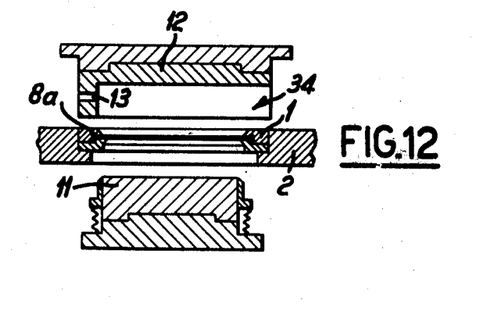

The punch 9 and the die 10 move apart and the waste 8 is carried by rotation of the plate 10 to a waste discharge station (FIG. 10). Waste discharge is effected by cutting the waste at the level of the internal surface of the ring 1 by a cutting punch 11 which comes to lift the ring from below, apply it against an abutment 12 and sever the waste 8 which is removed by a jet of compressed air 13 (FIG. 11).

Finally, the cutting piston 11 is lowered, the ring 1 resumes its position in the transfer plate 2 and is again transferred to the injection position (FIG. 2).

It should also be noted that a part 8a of the waste 8 remains held in the ring 1 so that the total amount of waste is reduced. The volume of plastics material injected will be reduced for the subsequent injection operation, to take into account the volume of waste which is reutilized.

In certain cases, this reduction in waste can reach 50 percent and more. When the subsequent injection and compression operations are carried out, the new plastics material is automatically welded to the material remaining in the hooking groove 7 of the ring 1 and the new diaphragm 6a is thus also secured to the ring 1.

It will be noted from the foregoing that the main original and novel points of this process are:

a. Injection at reduced pressure of a pad of plastics material into a space which is adapted to produce two plane parallel faces on said pad but which does not limit its radial expansion when plastics material is introduced.

b. Compression of said pad of plastics material to put it into the form of a thin diaphragm and simultaneously to cause the diaphragm to be held, at its periphery only, to a transfer body.

c. Transfer of the diaphragm to the shaping station, with contact of the diaphragm with other mechanical members being kept to a minimum. The only contact is in fact between the periphery of the diaphragm and the transfer body while the plane faces of the diaphragm are freely displaced in the ambient air.

d. Reduction in the volume of plastics material waste. This reduction results from the reutilization of at least one part of the waste (plastics material engaged in the retaining portion of the transfer body).

In this case, in certain cases it is also possible to reduce waste to a negligible quantity or nil in certain uses for which it is possible, from the point of view of the shaping operation, to produce the desired container from a rough shape or a diaphragm of plastics material of which the diameter is only slightly greater than that of the aperture in the die. In fact, under such circumstances, the waste is no longer severed (FIGS. 10, 11, 12) but all the waste 8 (the annular portion 8 of which is of narrow width) is transferred to the injection position and the new diaphragm of plastics material is welded at its peripheral edge to the waste of the preceding diaphragm during the compression operation. This process obviously causes internal stresses in the diaphragm at the welded joint between the waste and a new diaphragm, but as this portion of plastics material is not used for shaping the container, these defects in the diaphragm have no effect whatever on the shaping and the quality of the container.

In another embodiment of the process described, all the waste of the diaphragm can be ejected after shaping and severing the shaped container.

The advantages of the process described are mainly:

a. Reduction in waste, resulting in a reduction in cost price for manufacture of a container.

b. Reduction in the thickness of the walls of a container, owing to the uniformity of the diaphragm of plastics material from which a container is produced. It follows that the weight of plastics material used for production of a given container having given mechanical characteristics is reduced, entailing a similar reduction in the cost price of the container.

c. Omission of heating and temperature regulation of the transfer device.

d. Simplification of the injection device, injection being effected at a very low pressure which is only slightly higher than atmospheric pressure.

e. Construction of a transfer device which is not subjected to forces due to compression, injection or shaping of the plastics material. This is obtained by virtue of the transfer body which is mounted freely on the transfer plate to which it does not transmit any force.

f. Finally, this process can be used for any type of heat-shaping, i.e. mechanical, pneumatic, under pressure, under vacuum, with or without counter-blowing etc., as the shaping station is independent of the remainder of the apparatus. Therefore the most suitable shaping process can be selected, depending on the shape of the container desired and on the plastics material used. A method of shaping which is particularly well adapted to the present process is that described in Swiss Pat. No. 375,138.

Figure 1:
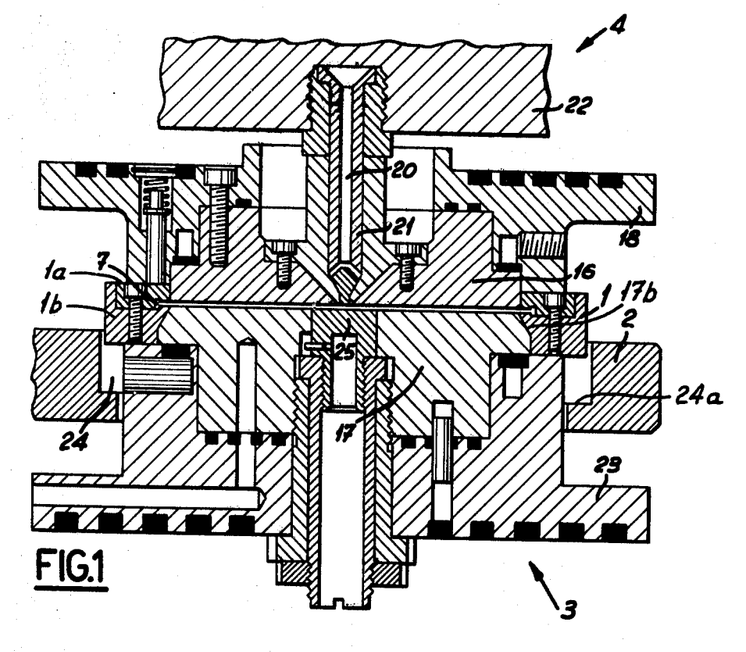
FIG. 1 is a sectional view of the injection and compression device in the compression position.
Figure 13:
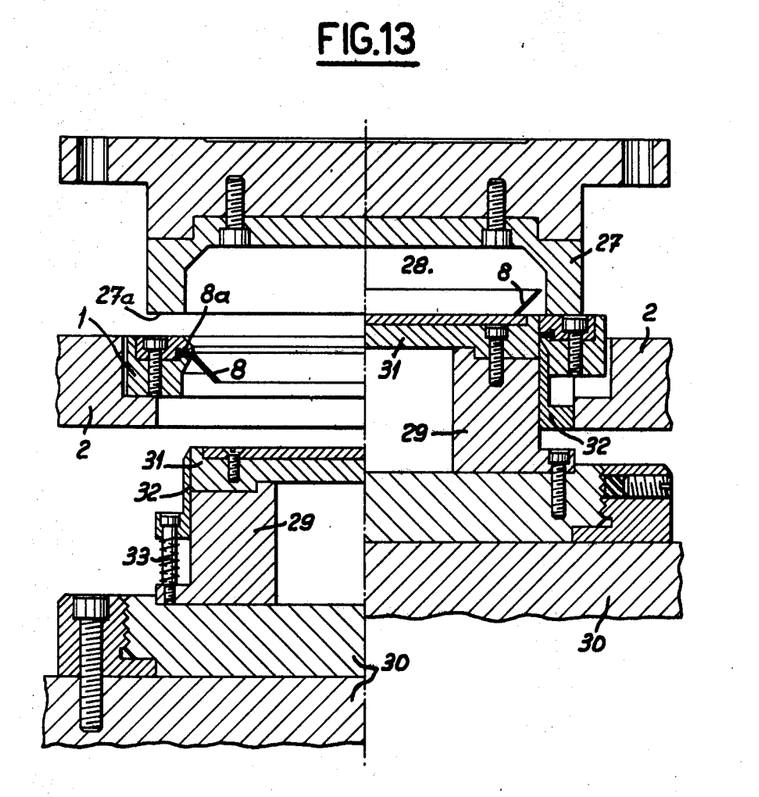
FIG. 13 is a view in two half-sections of a device for severing waste, the left-hand part being in the rest position and the right-hand part being in the operative position.

The heat-shaping apparatus comprises a transfer device formed by a rotary transfer plate 2 provided with apertures which are distributed uniformly on a circumference close to the periphery of the plate and adapted to receive transfer bodies, an injection and compression device illustrated in greater detail in FIG. 1, a sequential control device which may be electrohydraulic and which will not be described in detail here, and a device for discharging the plastics material waste, which is illustrated in greater detail in FIG. 13.

The injection and compression device which is illustrated in FIG. 1 in its end-of-compression position comprises a fixed injection piston 16 and a support piston 17 located on respective sides of the transfer plate 2 so that when the plate 2 is in one of its angular positions of rest, one of the apertures 24 therein has its axis in line with the pistons 16 and 17. The injection piston 16 is secured to a fixed heater block 18, the temperature of which is maintained at a value which depends on the shaping temperature of the plastics material. The free face of the injection piston 16 is flat and is provided with an injection orifice 16a at its center, which is supplied with plastics material in the moldable state by a conduit 20, in the interior of which is located a blocking means 21. The blocking means 21 is integral with a movable bridge member 22 which is displaceable in a direction which coincides with the axis of the conduit 20 under the influence of an operator 22a to cause the injection orifice to be opened and closed by the blocking means 21.

The support piston 17 is secured to a movable block 23 which is displaceable axially with respect to the injection piston 16 and comprises a heating device.

As illustrated in FIG. 1, the transfer plate 2 comprises apertures 24 having an annular shoulder 24a, onto which a transfer ring 1 comes to lie in the position of rest. The ring 1 comprises two parts 1a and 1b which are fixed together and which define between them a retaining groove 7. The internal diameter of the upper part 1a of the ring 1 corresponds to the external diameter of the injection piston 16, while the shape and dimensions of the internal wall of the lower part 1b of the ring 1 correspond to the shape and dimensions of the frontal portion of the support piston 17, the face 17a of which is flat. The shape of the frontal portion of the piston 17 is such that the ring 1 is lifted at least partly out of the aperture 24 when the piston 17 is displaced axially upwardly. When the ring 1 rests on the frontal portion of the piston 17, the frontal flat surface 17a of the piston 17 lies approximately in the plane of the retaining groove 7.

The injection and compression device operates in the following manner:

When the support piston 17 is in the retracted lowered position, its frontal face 17a lies below the transfer plate 2 and by rotation of the transfer plate 2, an aperture 24 carrying a ring 1 is placed between the support piston 17 and the injection piston 16, substantially coaxially to the axis of the injection and compression device.

The support piston 17 is then displaced toward the injection piston by a distance sufficient for the ring 1 to lie on the frontal portion of the piston 17, ensuring that the ring 1 is absolutely centered on the piston 17. In order to avoid the necessity of positioning the plate 13 with an excessive degree of precision, the apertures 24 have a diameter which is larger than the external diameter of the ring 1, so that the ring 1 is self-centered by the piston 17 by virtue of the conical faces 17b of the piston and the ring coming into contact. The first forward travel of the piston 17 is such that the upper part of the ring 1 comes to engage around the injection piston 16 at a small distance or in the immediate proximity, while leaving a relatively large space between the front faces of the pistons 16 and 17, for example a few millimeters (larger than that illustrated in FIG. 1).

The bridge member 22 is then raised and displaces the blocking means 21 upwardly, which thus frees the injection orifice and plastics material in the moldable state is injected into the space between the two pistons 16 and 17. The injection pressure is low as the amount of plastics material which has to be injected is less than the volume of the available space. This plastics material spreads in the form of a thick pad between the pistons 16 and 17 in the interior of the ring 1. The bridge member 22 is lowered to cause the injection orifice to be blocked, when the required amount of plastics material which is necessary for shaping a container, has been introduced between the pistons 16 and 17.

The support piston 17 is then displaced in a second forward travel toward the injection piston 16 to compress the injected plastics material and to make it into the shape of a thin diaphragm which fills the retaining groove 7 and all the space included between the pistons 16 and 17. This compression movement puts the plastics material under a high pressure and as the pistons 16 and 17 are heated to the desired temperature, the plastics material is distributed uniformly so that the diaphragm formed does not suffer from any undesired internal stresses.

Finally the support piston 17 is returned to its retracted lowered position and the ring 1 which carries the diaphragm 6a of plastics material falls back into the aperture 24 in the transfer plate 2.

Rotation of the transfer plate 2 will move a further ring 1 into the injection-compression position and will effect, or at least advance, transfer of the diaphragm 6a toward the shaping device.

The support piston 17 also comprises a central portion 25, the position of which can be adjusted with respect to the piston 17. This permits a diaphragm of plastics material to be shaped in the compression operation, the central portion of which diaphragm is of a different thickness from the remainder of the diaphragm, being either thicker or thinner depending on whether the front face of the center 25 is lower than or projects from the front face 17a of the piston 17. This central portion is not necessary in every case.

In addition, by circulating liquid, for example water, it is possible to maintain the central portion 25 at a lower temperature than the remainder of the piston 17, which forms a central "cold" zone, i.e. colder than the remainder of the plastics material, this cooling already being effective when the plastics material is injected and then when it is compressed to shape the diaphragm 6a. This "cold" zone ensures uniform radial spreading of the plastics material when injected and then when compressed, which is an important factor for producing a uniform diaphragm which is well suited to the subsequent shaping operation.

It should also be noted that a particular feature of the injection device lies in the size of the injection orifice 16a formed in the piston 16. In fact this orifice is much larger (with a diameter which can be up to several millimeters) than the orifices of conventional injection nozzles. This is possible because the plastics material is not put under pressure during injection but only afterwards during compression when the injection orifice is again closed. This particular feature firstly permits very rapid injection of the required amount of plastics material and then a better degree of homogeneity of the mass of plastics material injected.

For a given plastics material and a desired diaphragm size (volume of plastics material) the temperature of the pistons 16 and 17 and the distance between them when the plastics material is injected, are critical parameters which can be determined experimentally depending on particular circumstances. Optimization of these parameters is effected on the basis of the result obtained when shaping a diaphragm, i.e. of the quality of the container produced.

The transfer of the diaphragm 6a into the shaping device can be effected in one or more successive steps corresponding to successive angular displacements of the plate 13 according to the relative position of the injection and compression devices and the shaping device. The number of successive steps and therefore the transfer time will be determined by the difference in temperature necessary for shaping and for compression of the plastics material; if this difference is great, a long duration transfer operation will be carried out in order to permit the diaphragm 6a to cool during contact with the ambient air.

In an alternative embodiment, the transfer body is made in two detachable parts in order to facilitate ejection of all the plastics material waste after shaping the thin-walled container. This transfer body (FIGS. 17 to 25) comprises a lower ring 55 and an upper ring 56 which can be placed thereon and which define between them when in the assembled position an annular retaining groove 57 adapted to permit a diaphragm of injected and compressed plastics material to be secured to the transfer body. The retaining groove 57 is formed, when the two rings are applied against each other, by a flat annular portion of the upper surface of the lower ring and the internal edge of the upper ring which, depending on the plastics material used, can have for example one of the shapes illustrated in FIGS. 17 to 24. It is obvious that as an alternative embodiment it is the edge of the lower ring which could have the shapes illustrated in FIGS. 17 to 24.

Figure 25:
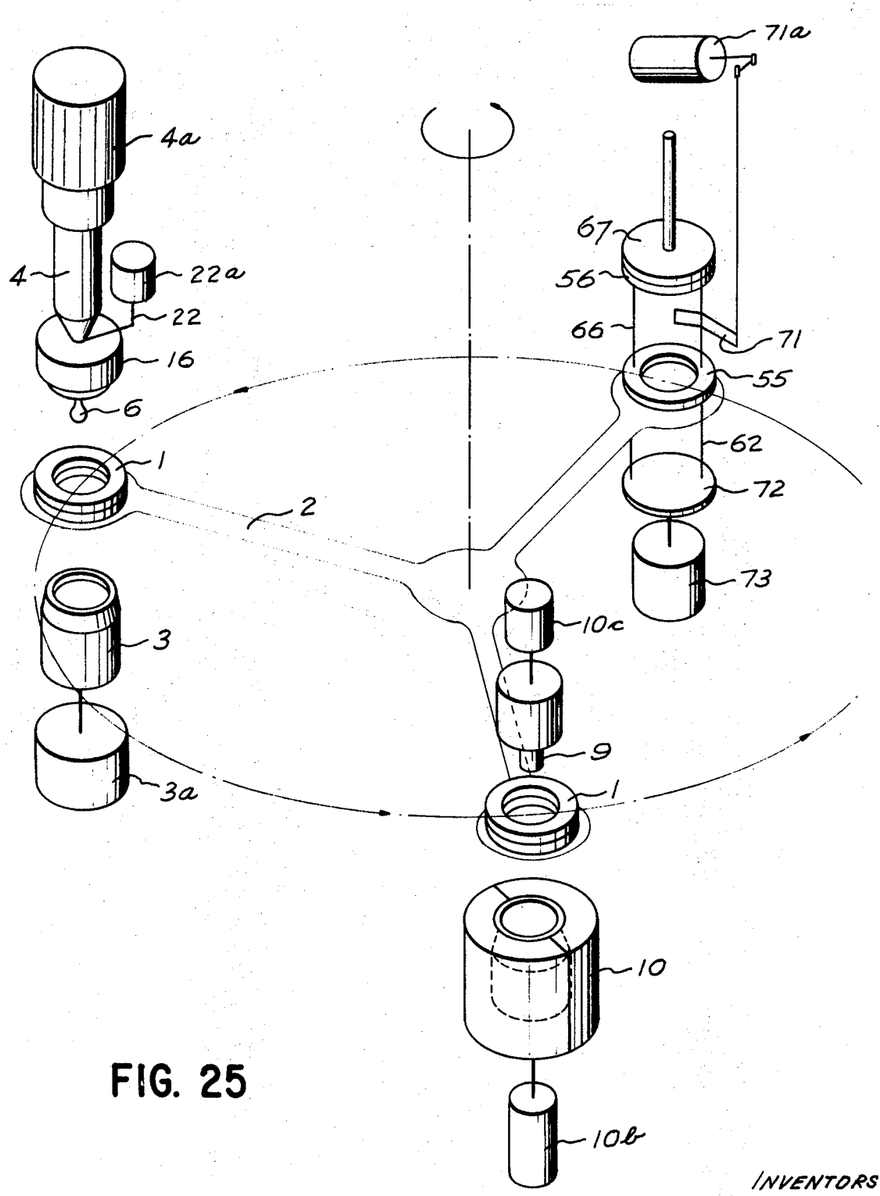
FIG. 25 is an exploded schematic perspective view showing the relation to each other of the various work stations of the apparatus of the invention.

The upper ring 56 also has at least two drillings 58 and two lugs 59 which project beyond the periphery of the lower ring 55. The drillings and the lugs are generally diametrically opposed.

The transfer plate 2 has recesses 60 so that the lugs 59 are accessible from above the transfer plate 2.

As already indicated above, the shaping device can be any device whatever, depending on the shaping method used to produce the desired containers. The shaping device will comprise a die 10 and a punch 9 arranged on respective sides of the transfer plate 2 and located so as to be aligned with one of the apertures 24 when the plate 2 is in one of its angular rest positions. The punch 9 will then be displaced through the ring 1 located in the aperture 24 to deform the diaphragm 6a to draw it into the interior of the cavity in the mold in which it will be inflated by pressure unit 10c or by vacuum unit 10b, so as to be applied against the walls 10a of the mold and form the container.

The device for ejecting plastics material waste is illustrated in FIG. 13. This device is intended to remove the waste which is in the form of an annular portion of plastics material remaining from the diaphragm 6a after the central portion thereof has been used and severed from the remainder of the diaphragm for the operation of shaping a container.

It will be obvious that because of the size of the transfer ring 1 and the position of the cutter means 26 (FIGS. 6 to 9) of the shaping device, the amount of waste will be kept as small as possible, i.e. the width of the annular portion of plastics material will be as reduced as possible.

The waste divides moreover into two distinct parts, on the one hand the annular portion of plastics material 8 which extends freely in the interior of the transfer body 1 and which is the waste proper, and on the other hand the volume of plastics material 8a located in the retaining groove 7 of the transfer body 1, which is a reusable part of the waste. In fact, as indicated hereinbefore, it is possible during the injection-compression of a further diaphragm 6a of plastics material, for the diaphragm 6a to be made integral with the material 8a remaining from the preceding cycle in the retaining groove 7 of the transfer ring 1.

In the case which has also been mentioned hereinbefore in which the portion 8 of the waste can be sufficiently reduced and in which the new diaphragm of plastics material is welded during injection-compression to this portion 8 of the waste, the heat-shaping apparatus will not include the waste ejection device which will be described hereinafter.

The left-hand part of FIG. 13 illustrates the waste ejection device in the rest position while the right-hand part of this figure illustrates its operating position. The ejection device is placed in the path of a transfer ring in such a way that the latter comes to be approximately centered on the ejection device when the transfer plate 2 is in one of its angular rest positions. The ejection device comprises on the one hand an upper fixed portion 27 having a recess 28, the internal diameter of which is greater than the internal diameter of the transfer ring 1. The free front face 27a of the fixed portion 27 forms an axial abutment adapted to maintain the transfer ring 1 in a given position when the waste is ejected. This fixed portion 27 is located above the transfer plate 2 while a shearing means 29 located below the transfer plate 2 is mounted on a movable block 30 which is displaceable axially toward the fixed portion 27. The frontal part of the shearing means 29 is formed by a plate 31 of hardened steel, the external diameter of which corresponds to the smallest internal diameter of the transfer ring 1 and the peripheral edge of which forms a circular shearing edge.

A centering sleeve 32 surrounds the shearing means 29 and is capable of axial displacement relative to the shearing means 29 against the action of an elastic return force (spring 33). The external shape of the upper part of the sleeve 32, the front edge of which lies when in the position of rest in the plane of the front surface of the plate 31 of the shearing means 29, corresponds to the shape of the internal surface of the lower part of the transfer ring 1.

In this manner, when upon angular displacement of the transfer plate 2, a transfer ring 1 which has already passed through the shaping position in which it cooperated with the shaping device is placed in the ejection device, the movable block 30 is displaced toward the fixed upper portion 27 and entrains in its movement the transfer ring 1 which is automatically centered on the frontal portion 31 of the shearing means 29 by means of the sleeve 32. When the upper surface of the transfer body 1 comes into contact with the front abutment 27a of the fixed portion 27 and the movable block 30 continues its rising travel, the sleeve 32 is displaced with respect to the shearing means 29 against its resilient return spring 33, while the frontal plate 31 shears the waste 8 at the level of the internal surface of the transfer ring 1 at the point at which the portion 8 of the waste emerges from the retaining groove 7 in the transfer ring 1.

The ring of waste 8 then rests on the end face of the shearing means 29 and is moved during the end of the advance travel of the shearing means 29, into the interior of the recess 28. The recess 28 comprises a lateral aperture 34 (FIGS. 10 to 12) and a blowing orifice 13. When the waste 8 lies in the recess 28, compressed air is passed through the blowing orifice 13 and the waste 8 is ejected from the recess 28 through the aperture 34. This waste can be collected in a container.

Finally, the movable block 30 is lowered into its rest position to permit further angular displacement of the transfer plate 2.

It is obvious that a number of injection-compression, shaping and waste ejection cycles can be carried out simultaneously. In fact, for each angular rest position of the transfer plate 2, the injection-compression, shaping and waste ejection operations can be carried out simultaneously on different transfer rings.

To increase the speed of container production, the apparatus can include a plurality of injection-compression, shaping and waste ejection devices which cooperate with a single transfer plate 2.

Likewise, displacement of the transfer plate 2 could be linear and not circular if the devices which cooperate with the transfer rings 1 carried on the plate are positioned correctly with respect to the rest positions of the transfer plate 2.

Additionally, the transfer rings 1 have been described as being circular but their shape when seen in plan can be varied. The transfer rings 1 can be oval or oblong for example when it is desired to produce a container of a particular shape or when a number of containers are to be shaped simultaneously from a single diaphragm of plastics material by means of a shaping tool having a plurality of operative portions. In such cases, it is obvious that the shape of the injection and support pistons and of the shaping tool and the shearing means would have to correspond to the shape of the transfer bodies 1.

In an embodiment (FIGS. 15 and 16) for carrying out a modified form of the aforedescribed process in which all the waste is ejected, the fixed block 18 carrying the injection piston 16 of the injection-compression device is shorter at the forward end and is extended by a spacer ring 40 which slides without play in the axial direction along the periphery of the injection piston 16. The ring 40 is acted upon by springs 41 which tend to maintain it in an advanced position which its annular end face 40a lies in a plane slightly in front of the plane of the end face of the injection piston. In the retracted position, the ring 40 lies behind the end face of the injection piston.

Figures 14, 16:
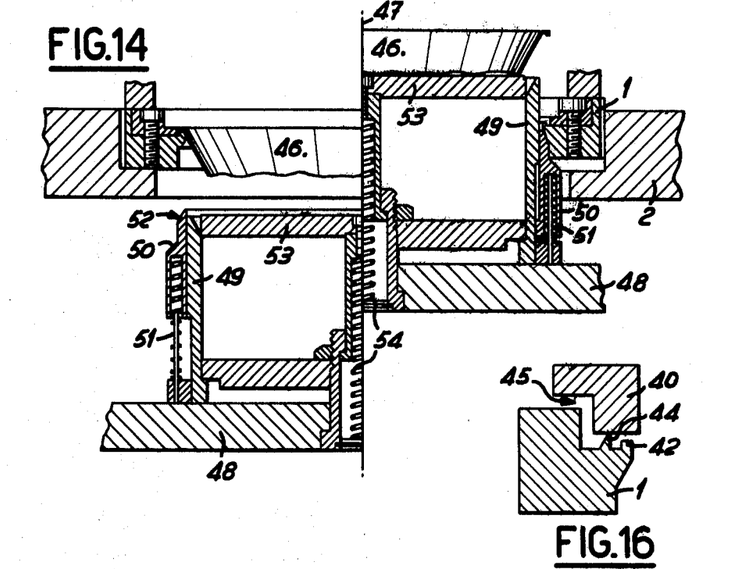
FIG. 14 shows a partial section, in two different positions, of a device for ejecting the remainder of the diaphragm.
FIG. 16 shows a detail cross section of another embodiment of the injection and compression device and a transfer body.
Figure 15:
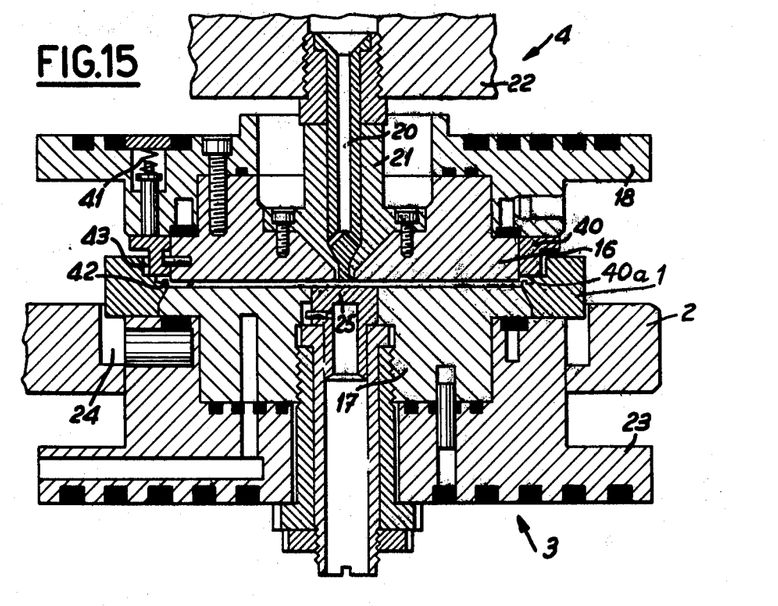
FIG. 15 shows a section of an alternative embodiment of the injection and compression device of the apparatus.

The remainder of the injection and compression device is similar to that described hereinbefore and will not be described here.

In this embodiment, the transfer body 1 is in one piece and the annular retaining groove or peripheral hooking formation is formed by a raised edge 42 which comes into contact with only one face of a diaphragm of plastics material. The raised edge 42 is such that it permits the diaphragm to be engaged for transfer but does not prevent the diaphragm being withdrawn in an axial upward direction out of the body 1.

The transfer body 1 also comprises an annular abutment 43 adapted to come into contact with the end face of the ring 40. Thus in the compression position (illustrated in FIG. 15) the mold defining the shape of the plastics material diaphragm is formed by the support piston, a part of the peripheral surface of the body 1, a part of the end face of the ring 40 and the injection piston 16.

In an alternative embodiment illustrated in FIG. 16, the transfer body comprises, outwardly of the raised edge, an annular cutting portion 44 which forms the abutment intended to come into contact with the spacer ring 40. Thus, if when the support and injection pistons are brought together there is an excessive amount of plastics material between them to produce the diaphragm, the plastics material escapes through the annular space 45 by displacing the ring 40 against its return springs 41. At the end of the travel of the pistons 16 and 17, the ring 40 abuts against the fixed block 18 and its end face is applied with a high force against the cutting edge 44, severing the excess plastics material (in the space 45) of the diaphragm produced.

The transfer device (except the modification of the transfer bodies) and the heat-shaping device can be identical to those described and illustrated hereinbefore.

However in this embodiment the device for ejecting waste after shaping a container is different; this device is illustrated in FIG. 14.

This device for ejecting all the waste 46 of a diaphragm of plastics material comprises a tool which is displaceable along a vertical axis 47 which is aligned with a rest position of a transfer body 1 of the transfer device.

The tool comprises a movable block 48 which is displaceable between an advanced position and a retracted position in which all the tool is located below the plate 2 of the transfer device (left-hand part of FIG. 14. The movable block 48 carries an annular punch means 49, the upper edge of which is of an external diameter corresponding to the internal diameter of the aperture in the transfer body 1. The punch means 49 is enclosed by a centering guide 50 which slides freely against the action of return springs 51 on the external cylindrical face of the punch means 49. The upper chambered face 52 of the guide 50 is adapted to cooperate with the lower part of the aperture in the transfer body 1 in order exactly to center the latter on the tool.

Finally a piston 53 slides freely against the action of a spring 54 inside the annular punch means, the upper face of which is adapted to come into contact with the waste 46.

The waste ejection device operates in the following manner:

When the transfer device is arrested in one of its positions and a transfer body 1 provided with the waste of a diaphragm of plastics material is placed opposite the ejection tool, the movable block 48 is displaced upwardly so that during its movement, the guide 50 centers and lifts the transfer body and then the punch means 49 which acts on the periphery of the waste to sever it from the transfer body 1. Before this, in the course of its movement the piston 53 came into contact with the waste and the spring 54 was compressed. When the waste has been severed from the body 1 by the punch means 49, the transfer body being held against a fixed retaining abutment means, the piston 53 is displaced under the action of its spring 54 and the waste 46 is displaced until it lies above the upper edge of the punch means 49. An air jet or any other means, for example mechanical, then removes the waste 46 from the upper surface of the piston 53 and the ejection device returns downwardly into its retracted position.

The main advantages of the aforedescribed embodiment are:

a. Possibility of making the transfer body in one piece and by turning or screw-cutting operations only.

b. Mechanical simplification of the waste ejection device.

c. Simplification in regulating the injection device and particularly the amount of plastics material injected, owing to the fact that the excess of material is automatically ejected through the annular space 45 and that it is severed from the diaphragm when the diaphragm is compressed.

Where the apparatus comprises transfer bodies formed by two superposed rings, the device (FIG. 17) for separating the transfer bodies for ejection of all the waste plastics material after shaping the container comprises a vertically movable assembly 61 disposed below the transfer plate and aligned with a rest position of a transfer body. This assembly which is illustrated in the rest position in the left-hand part of FIGS. 17 and in the operative position in the right-hand part of FIG. 17, comprises check means 62 aligned with the apertures 60 in the transfer plate and aligned vertically with the lugs 59. This assembly further comprises a punch means 63 aligned with the aperture in the transfer body and surrounded by a sleeve 64 which slides axially against an elastic retaining force provided by a spring 65. The sleeve 64 is adapted to come into contact with the lower face of the lower ring 55.

Figure 17:
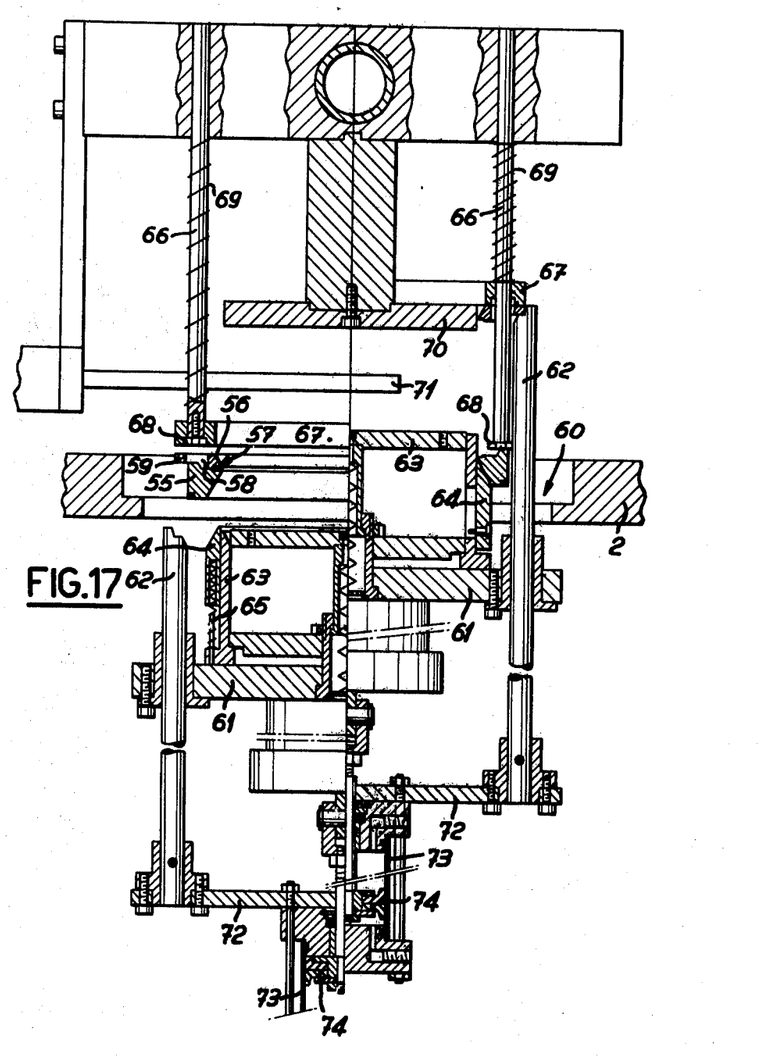
FIG. 17 shows a partial section, in two different positions, of the severing and ejection device.
Figure 18:
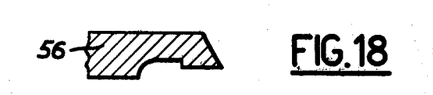
FIGS. 18 to 24 show sections of parts of alternative embodiments of the internal edge of one of the rings of the transfer body.
Figure 19:
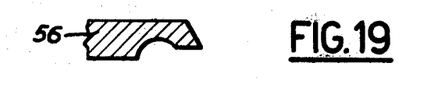
Figure 20:
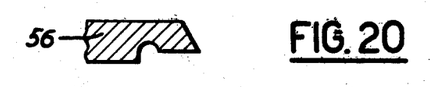
Figure 21:
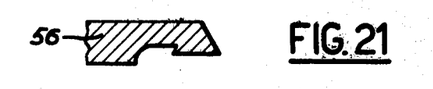
Figure 22:
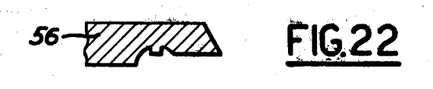
Figure 23:
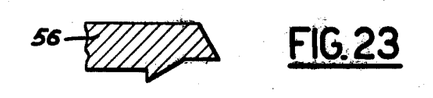
Figure 24:
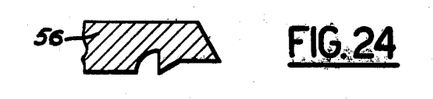

This device also comprises an upper fixed assembly above the transfer plate and aligned with the lower assembly.

The upper assembly comprises vertical rods 66 fixed rigidly to a bridge member 72 of the apparatus and located in line with the drillings 58 in the upper ring 56. A ring 67 is slideably mounted on the rods 66 and maintained in a low position in which it abuts against screw means 68, by an elastic force produced by springs 69 which surround the rods 66.

The upper assembly further comprises an upper abutment means 70, the diameter of which corresponds to the internal diameter of the upper ring 56.

Finally, the bridge member 72 is made integral with the cylinder 73 of a double-acting ram of which the piston 74 is rigidly connected to the movable assembly 61.

The aforedescribed device operates in the following manner:

When the transfer plate 2 is immobilized with a transfer body carrying plastics material waste being positioned in alignment with the upper assembly and the lower assembly 61 of the device, the following operations are carried out automatically under the control of the central control station of the apparatus.

1. The lower movable assembly is raised simultaneously with the bridge member 72 and causes the rings 55 and 56 to be simultaneously lifted through the intermediary of the sleeve 64 from the punch means 62 and the check means 62 respectively.

2. The rods 66 pass through the holes 58 in the upper ring 56 and come into abutment against the upper face of the lower ring 55, limiting its vertical movement.

3. The bridge member 72 continues to move, the upper ring 56 is displaced by the check means 62 conjointly with the ring 67 against which it abuts, while there is relative displacement between the ring 68 and the piston 65, the upper face of which entrains the waste and detaches it from the lower ring. This subsequent displacement of the bridge member 72 with respect to the movable assembly 61 is effected by means of the ram 73, 74.

4. At the end of the rising travel the upper ring 56 is passed around the abutment 70 so that if the waste had remained clinging to the upper ring 56, it would be detached and would fall on to the piston 63.

5. Ejection proper of the waste is effected by means of a pivoting arm 71 operated by unit 71a, or any other means such as for example a jet of compressed air.

6. The lower movable assembly returns to its starting position and successively replaces the rings on top of each other and then on the transfer plate.

We claim:

1. Apparatus for heat-shaping thin-walled containers of plastic material, comprising a transfer device comprising a transfer body having an axial aperture therethrough and a peripheral hooking formation located on said body adjacent said aperture for retaining a diaphragm of plastic material on said transfer body, said peripheral hooking formation coming into contact with only one side of said diaphragm, an injection and compression device for supplying plastic material to form said diaphragm, said device having a support piston and an injection piston disposed on opposite sides of said transfer body and displaceable axially relative to each other, each of said pistons cooperating with one side of said transfer body to close the axial aperture thereof in order to form a closed space confined between the pistons and the transfer body thereby to shape said diaphragm, said transfer device transferring the transfer body from its injection and compression position into a forming position, means to form the diaphragm retained by said transfer body into a container, said forming means comprising a punch and a die located on opposite sides of the transfer body when the transfer body is in said forming position, said punch and die being displaceable relative to each other to form a container, means for ejecting all the remainder of the diaphragm of plastic material after said container is formed, said peripheral hooking formation comprising an annular raised rim, a spacer ring surrounding said injection piston and displaceable axially relative to said injection piston between an advanced position in which an end face of said spacer ring lies in front of the plane of the end face of said injection piston and a retracted position in which said end face of said spacer ring lies entirely behind the end face of said injection piston, and spring means urging said spacer ring toward said advanced position.

2. Apparatus as claimed in claim 1, said transfer body having an abutment on an upper face thereof against which said end face of said spacer ring rests in said advanced position.

3. Apparatus as claimed in claim 2, said abutment being annular and comprising a cutting edge.

4. Apparatus for heat-shaping thin-walled containers of plastic material, comprising a transfer device comprising a transfer body having an axial aperture therethrough and a peripheral hooking formation located on said body adjacent said aperture for retaining a diaphragm of plastic material on said transfer body, said peripheral hooking formation coming into contact with only one side of said diaphragm, an injection and compression device for supplying plastic material to form said diaphragm, said device having a support piston and an injection piston disposed on opposite sides of said transfer body and displaceable axially relative to each other, each of said pistons cooperating with one side of said transfer body to close the axial aperture thereof in order to form a closed space confined between the pistons and the transfer body thereby to shape said diaphragm, said transfer device transferring the transfer body from is injection and compression position into a forming position, means to form the diaphragm retained by said transfer body into a container, said forming means comprising a punch and a die located on opposite sides of the transfer body when the transfer body is in said forming position, said punch and die being displaceable relative to each other to form a container, means for ejecting all the remainder of the diaphragm of plastic material after said container is formed, said ejecting means comprising a vertically displaceable tool centered on said transfer body, said tool comprising punch means whose external diameter corresponds to the internal diameter of said aperture in said transfer body.

5. Apparatus as claimed in claim 4, said tool comprising a centering device slidably mounted about said punch means and having a frontal end whose shape corresponds to the shape of said aperture in said transfer body.

6. Apparatus as claimed in claim 5, said tool comprising a piston axially displaceable against the action of spring means in the interior of the punch means, said last-named piston having an upper free face which emerges from said punch means.

7. Apparatus for heat-shaping thin-walled containers of plastic material, comprising a transfer device comprising a transfer body having an axial aperture therethrough and a peripheral hooking formation located on said body adjacent said aperture for retaining a diaphragm of plastic material on said transfer body, said peripheral hooking formation coming into contact with only one side of said diaphragm, an injection and compression device for supplying plastic material to form said diaphragm, said device having a support piston and an injection piston disposed on opposite sides of said transfer body and displaceable axially relative to each other, each of said pistons cooperating with one side of said transfer body to close the axial aperture thereof in order to form a closed space confined between the pistons and the transfer body thereby to shape said diaphragm, said transfer device transferring the transfer body from its injection and compression position into a forming position, means to form the diaphragm retained by said transfer body into a container, said forming means comprising a punch and a die located on opposite sides of the transfer body when the transfer body is in said forming position, said punch and die being displaceable relative to each other to form a container, said transfer body comprising two superposable rings which together from said peripheral hooking formation, and means for separating the two rings in order to eject all the remainder of the diaphragm of plastic material after shaping of the container.

8. Apparatus as claimed in claim 7, said peripheral hooking formation being formed by a flat annular portion carried by one of said rings and by an annular portion in the shape of the other said ring.

9. Apparatus as claimed in claim 8, the upper of said two rings having at least two holes passing through it to give access to the upper face of the lower ring.

10. Apparatus as claimed in claim 9, said upper ring also comprising at least two lugs disposed on a larger diameter than the diameter of said lower ring.

11. Apparatus as claimed in claim 10, said separating means comprising a vertically displaceable lower assembly having two check means that coact with said lugs and a piston that coacts with said lower ring and with the waste plastic material.

12. Apparatus as claimed in claim 11, the last-named piston comprising a central portion having a diameter corresponding to the internal diameter of the transfer body and a sleeve mounted slidably around said central portion and spring means acting on said sleeve and tending to maintain said sleeve raised.

13. Apparatus as claimed in claim 12, said separating means comprising an upper assembly having vertical rods aligned with said holes in said upper ring and an abutment means whose diameter corresponds to the internal diameter of the upper ring.

14. Apparatus as claimed in claim 13, and a ring mounted for sliding motion along said rods, and spring means urging said ring downwardly against a relatively fixed abutment means.